United States Patent [19]

Rempel et al.

[11] Patent Number: 5,057,581

[45] Date of Patent: Oct. 15, 1991

[54] POLYMER HYDROGENATION PROCESS

[75] Inventors: Garry L. Rempel; Neil T. McManus, both of Waterloo; Narvoz Mohammadi, Sarnia, all of Canada

[73] Assignee: University of Waterloo, Waterloo, Canada

[21] Appl. No.: 518,434

[22] Filed: May 2, 1990

[51] Int. Cl.$^5$ .............................................. C08F 8/04
[52] U.S. Cl. ................... 525/338; 525/329.3; 525/339; 525/355; 525/340; 525/370
[58] Field of Search ........... 525/355, 338, 339, 329.3, 525/340, 370

[56] References Cited

U.S. PATENT DOCUMENTS

| | | |
|---|---|---|
| 3,480,659 | 11/1969 | Dewhirst . |
| 3,700,637 | 10/1972 | Finch Jr. . |
| 3,898,208 | 8/1975 | Krause . |
| 4,464,515 | 8/1984 | Rempel et al. . |
| 4,503,196 | 3/1985 | Rempel et al. . |
| 4,631,315 | 12/1986 | Buding et al. . |
| 4,812,528 | 3/1989 | Oshima et al. . |
| 4,816,525 | 3/1989 | Rempel et al. . |

FOREIGN PATENT DOCUMENTS 1558491 1/1980 United Kingdom .
2070023 9/1981 United Kingdom .

*Primary Examiner*—Paul R. Michl
*Assistant Examiner*—T. McDonald, Jr.
*Attorney, Agent, or Firm*—Sim & McBurney

[57] ABSTRACT

Selective hydrogenation of the carbon-carbon double bonds of conjugated diene copolymers is effected in homogeneous solution in an organic solvent in the presence of certain divalent ruthenium carbonyl complex catalysts containing phosphine ligands having bulky alkyl substituents. The ruthenium catalysts have the general formula:

$$RuXY(CO)ZL_2 \quad (1)$$

or $$RuX(NO)(CO)L_2 \quad (2)$$

wherein X is a halogen atom, most preferably chlorine, or a carboxylate group, Y is a halogen atom, more preferably chlorine, a hydrogen atom, a phenyl group, a carboxylate group or phenylvinyl group, Z is carbonyl, pyridine, benzonitrile, trimethylphosphite or no ligand and L is a phosphine ligand having at least one bulky alkyl substituent, preferably tricyclohexyl or triisopropyl.

24 Claims, No Drawings

POLYMER HYDROGENATION PROCESS

FIELD OF INVENTION

The present invention relates to the selective hydrogenation of the carbon-carbon double bonds in a copolymer of a conjugated diene and one or more copolymerizable monomers using a particular catalyst.

BACKGROUND TO THE INVENTION

Several homogeneous and heterogeneous processes based on rhodium or palladium metal catalysts have been proposed and are now being used to hydrogenate carbon-carbon double bonds in acrylonitrile-butadiene copolymers and other similar polymers.

For example, French Patent No. 2,421,923 discloses the partial hydrogenation of the double bonds in acrylonitrile-butadiene rubber (NBR) over a palladium/charcoal catalyst.

German Offenlegungsschrift No. 3,046,008 discloses the selective hydrogenation of the double bonds in conjugated diene containing polymers such as NBR, wherein the catalyst is palladium and at least one other element on a support which may be silica, alumina or activated carbon.

German Offenlegungsschrift No. 3,046,251 discloses a similar process except that the catalyst support is channel or furnace carbon black.

Published British Patent Application No. 2,070,023A discloses a process for the selective hydrogenation of the double bonds in unsaturated organic polymers such as acrylo-nitrile-butadiene-styrene polymers, when in the form of an aqueous emulsion, using a catalyst such as chloro-tris(triphenylphosphine)rhodium in a hydrocarbon solution.

U.S. Pat. No. 3,898,208 describes a process for hydrogenation of latexes of oil-insoluble polymers of conjugated dienes. The latex is dispersed in a swelling agent for the polymer and hydrogenated in the presence of a catalyst complex which may be a rhodium complex catalyst, such as chlorotris(triphenylphosphine)rhodium. The swelling agent must also be a solvent for the catalyst complex.

U.S. Pat. No. 3,700,637 discloses that the double bonds in alternating copolymers of conjugated dienes and unsaturated nitriles may be hydrogenated using catalysts which preferably are homogeneous rhodium halide complex catalysts having the formula L3RhX wherein X is halogen and L is an organophosphorus or organoarsenic stabilizing ligand. It is also preferred that an excess of the ligand be used during the hydrogenation, the mole ratio of ligand to rhodium complex being between about 10:1 and about 150:1.

British Patent No. 1,558,491 discloses the hydrogenation of the double bonds in copolymers of a conjugated diene and an $\alpha,\beta$-unsaturated carboxylic acid or derivative thereof, for example acrylonitrile, using as catalyst a homogeneous monovalent or trivalent rhodium halide complex of the formula $L_3RhX_n$ wherein X is chlorine or bromine, n is 1 or 3, and L is a ligand. An additional 5 to 25 weight percent, based on the copolymer of the ligand may optionally be used. The amount of hydrogenation is highly solvent dependent.

U.S. Pat. No. 3,480,659 describes a process for the selective hydrogenation of double bonds in unsaturated monomers containing 2 to 20 carbon atoms using a homogeneous rhodium hydride complex catalyst, for example, hydridotetrakis(triphenylphosphine)rhodium, along with an excess of a complexing ligand, for example triphenylphosphine. The mole ratio of ligand to catalyst is between about 10:1 and about 150:1.

Italian Patent No. 912,648 discloses that cycloalkadienes and alkadienes may be selectively hydrogenated to the corresponding cycloalkenes and alkenes using a catalyst, such as hydridotetrakis(triphenylphosphine)rhodium.

More recently, there issued U.S. Pat. Nos. 4,464,515 and 4,503,196 in which one of us, Rempel, is named as an inventor. U.S. Pat. No. 4,464,515 describes the hydrogenation of carbon-carbon double bonds in copolymers of conjugated dienes and copolymerizable monomers in the presence of a monovalent rhodium hydride complex of the formula $RhHL_{1x}$ in which x is 3 or 4 and $L_1$ is a first ligand, a second ligand compound $L_2$ and a solvent for the compound. U.S. Pat. No. 4,503,196 describes the selective hydrogenation in the absence of added ligand and in the presence of monovalent rhodium hydride complex of the formula $RhHL_x$, where, when x is 4, L is a phosphorus compound which is 5-phenyl-5H-dibenzophosphole or a compound of formula $PR_1R_2R_3$ or, when x is 3, L is an arsenic or antimony compound of the formula $MR_1R_2R_3$, wherein M is arsenic or antimony, and wherein $R_1$, $R_2$ and $R_3$ are selected from $CH_3$, $C_2H_5$, $C_{6-10}$ aryl groups and $C_{7-12}$ aralkyl groups.

The advantage of the processes described in the latter two patents is that improved rates of hydrogenation are achieved under relatively mild conditions and that the degree of hydrogenation is relatively insensitive to the amount of solvent used.

However, rhodium is an expensive metal and hence we made an investigation to look for an efficient but cheaper hydrogenation process based on other catalyst materials.

In U.S. Pat. No. 4,631,315, there is described the hydrogenation of nitrile group-containing polymers in a low molecular weight ketone as a solvent using certain ruthenium catalysts having the formula:

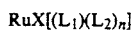

$$RuX[(L_1)(L_2)_n]$$

wherein X represents hydrogen or halogen, $L_1$ represents hydrogen, halogen or optionally substituted cyclopentadienyl, $L_2$ represents phosphine, bisphosphine or arsine, n is 1, 2 or 3 and $[(L_1)(L_2)_n]$ represents a cyclopentadienyl bisphosphine. The data presented in this patent suggests that free ligand is necessary to achieve acceptable reaction rates.

In published German patent application No. 3,529,252, there is also described the hydrogenation of nitrile group-containing polymers in a low molecular weight ketone using other ruthenium catalysts, this time of the formula:

$$RuH_m(COOR_1)_n(L)_p$$

wherein $R_1$ is an alkyl, aryl, cycloalkyl or aralkyl, L represents phosphine or arsine, m is 0 or 1, n is 1 or 2 and p is 2 or 3.

In addition, there has previously been described in U.S. Pat. No. 4,816,525, effecting selective hydrogenation of the carbon-carbon double bonds in a copolymer of a conjugated diene and at least one copolymerizable monomer in the presence of a divalent carbonyl ruthenium complex selected from the group consisting of:

(a) a ruthenium complex of the general formula:

$$Ru(CO)HA(Z)_3$$

wherein A is a halogen atom or a hydrogen atom, Z is a $-PR_1R_2R_3$ group in which $R_1$, $R_2$ and $R_3$ may be the same or different and are selected from alkyl and aryl groups, and (b) a ruthenium complex of the general formula:

$$Ru(CO)XY(Z)_2$$

wherein X is a carboxylate group, Y is a halogen atom, a carboxylate group or a hydrogen atom, and Z is as defined above.

In U.S. Pat. No. 4,812,528, such hydrogenation is described as being effected in the presence of a divalent nitrosyl ruthenium complex selected from the group consisting of:

(c) a ruthenium complex of the general formula:

$$Ru\ T(CO)(NO)(Z)_2$$

wherein T is a halogen atom and Z is as defined above, (d) a ruthenium complex of the general formula:

$$Ru\ T(NO)(Z)_2$$

wherein T and Z are as defined above, (e) a ruthenium complex of the general formula:

$$Ru\ H(NO)(Z)_3$$

wherein Z is as defined above, and (f) a ruthenium complex of the general formula:

$$Ru\ (NO)_2(Z)_2$$

wherein Z is as defined above.

Both U.S. Pat. Nos. 4,816,525 and 4,812,528 name one of us, Rempel, as a coinventor and are assigned to University of Waterloo, the assignee hereof. The disclosures of those patents are incorporated herein by reference.

SUMMARY OF INVENTION

It has now surprisingly been found that selective hydrogenation of the carbon-carbon double bonds in a copolymer of a conjugated diene and one or more copolymerizable monomers may be effected using a ruthenium complex of the general formula:

$$RuXY(CO)ZL_2 \quad (1)$$

or $$(RuX(NO)(CO)L_2) \quad (2)$$

wherein X is a halogen atom or a carboxylate group, Y is a halogen atom, a hydrogen atom, a phenyl group, a carboxylate group, or a phenylvinyl group, Z is CO, pyridine, benzonitrile, trimethylphosphite or no ligand, and L is a phosphine ligand having at least one bulky alkyl substituent.

Such ruthenium complexes have not previously been described as useful in polymer hydrogenation reactions. The advantages that these ruthenium complexes have over the ruthenium carbonyl complexes described in the prior U.S. patents referred to above, are (1) far superior rates of hydrogenation to those observed for other ruthenium complexes, permitting catalyst loadings to drop as low as 0.02% whilst using high polymer loadings of as high as 30%, (2) no isomerization is observed in contrast to other ruthenium catalysts, and (3) a decrease and usually virtual elimination of gel formation resulting from an undesired cross-linking reaction, particularly in the hydrogenation of acrylonitrile-butadiene copolymers. It is theorized that the bulky substituent group(s) on the phosphine ligand blocks the interaction of more than one polymer molecule at the metal center, thereby decreasing the likelihood of polymer cross-linking and increasing catalyst activity.

Accordingly, the present invention provides an improvement in a process for the selective hydrogenation of the carbon-carbon double bonds in a copolymer of a conjugated diene and at least one copolymerizable monomer. The improvement comprises effecting the hydrogenation in the presence of at least one divalent ruthenium carbonyl complex of the general formula:

$$RuXY(CO)ZL_2 \quad (1)$$

$$(RuX(NO)(CO)L_2) \quad (2)$$

wherein X, Y, Z and L are as defined above.

GENERAL DESCRIPTION OF THE INVENTION

Essential to the present invention is the effecting of selective hydrogenation of carbon-carbon double bonds in NBR, styrene-butadiene rubber and similar copolymers of conjugated dienes and copolymerizable monomers, using particular ruthenium complexes containing carbonyl, phosphine and halogen or carboxylate ligands.

One class of the ruthenium carbonyl complexes used in the present invention has the general formula:

$$RuXY(CO)ZL_2 \quad (1)$$

Another class of the ruthenium carbonyl complexes used in the present invention has the general formula:

$$RuX(NO)(CO)L_2 \quad (2)$$

In these formulae, X is a halogen atom, preferably a chlorine or bromine atom, more preferably a chlorine atom, or a carboxylate group corresponding to the formula $R_4COO-$.

The carboxylate group $R_4COO-$ may comprise alkyl or aryl carboxylate groups. Specific preferred carboxylate groups are mono-, di- or tri-halo substituted acetate, including $ClCH_2COO-$, $Cl_2CHCOO-$, $Cl_3CCOO-$ and $F_3CCOO-$, unsubstituted acetate i.e., $CH_3COO-$, unsubstituted benzoate i.e., $C_6H_5COO-$, alkyl substituted benzoate, including p-$CH_3C_6H_4COO-$ and halo-substituted benzoate, including p-$ClC_6H_4COO-$.

In the above formula (1), Y may be a halogen atom, preferably a chlorine or bromine atom, more preferably a chlorine atom, a hydrogen atom, a phenyl group, a carboxylate group corresponding to the formula $R_4COO$, preferably $PhCOO-$, or a phenylvinyl group, i.e.,

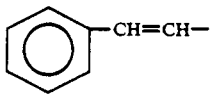

In the above formula (1), Z is carbonyl, pyridine or no ligand. Accordingly, specific subclasses of such compounds comprise:

$$RuXY(CO)_nL_2 \quad (3)$$

where n is 1 or 2; and $$RuXY(CO)(py)L_2 \quad (4)$$

where py is pyridine.

In the above formulae (1) and (2), L is a phosphine ligand of the formula $-PR_1R_2R_3$ in which the groups $R_1$, $R_2$ and $R_3$ may be the same or different and include at least one bulky alkyl substituent. The term "bulky alkyl substituent" is used herein to mean, with respect to phosphines, substituents which cause the phosphine cone angle, as defined by Tolman (see Chem. Rev. 77 (1977), 313) to be at least 160°. Preferred bulky alkyl substituents include cyclohexyl, isopropyl, tert-butyl, sec-butyl and benzyl.

It is preferred but not essential for all three of the groups $R_1$, $R_2$ and $R_3$ to be bulky alkyl substituents to achieve the greatest gel-formation suppression effect. However, one or two of such groups may comprise the bulky alkyl substituent. In most circumstances, the other(s) of the $R_1$, $R_2$ and $R_3$ groups may be any convenient alkyl and/or aryl group, preferably selected from methyl, ethyl, $C_6$ to $C_{10}$ aryl groups and $C_7$ to $C_{12}$ aralkyl groups.

Specific examples of particularly preferred ruthenium complexes useful herein include carbonylchlorohydrido bis(tricyclohexylphosphine) ruthenium (II), carbonylchlorohydridopyridyl bis(tricyclohexylphosphine) ruthenium (II), carbonylacetatohydrido bis(tricyclohexylphosphine) ruthenium (II), carbonyl chloroacetatohydrido bis(tricyclohexylphosphine) ruthenium (II), carbonylbenzoatohydrido bis(tricyclohexylphosphine) ruthenium (II), carbonyldichlorobis(tricyclohexylphosphine) ruthenium (II), carbonylchloro(phenylvinyl) bis (tricyclohexy lphosphine) ruthenium (II), biscarbonylchlorohydrido bis(tricyclohexylphosphine) ruthenium (II), carbonylchlorohydridobis (triisopropylphosphine) ruthenium (II), carbonylacetatohydrido bis(triisopropylphosphine) ruthenium (II), carbonylchlorobenzoato bis (tricyclohexylphosphine) ruthenium (II), carbonylchlorophenyl bis(tricyclohexylphosphine) ruthenium (II), and carbonylchloronitrosyl bis(tricyclohexylphosphine) ruthenium (II).

None of the ruthenium complexes of the above formulae (1) and (2) are disclosed or suggested in the prior art as useful to effect selective hydrogenation of carbon-carbon double bonds in copolymers of a conjugated diene and one or more copolymerizable monomers. The only prior art of which the applicants are aware which discloses ruthenium complexes for such a purpose are the aforementioned U.S. Pat. No. 4,631,315, German O.S. 3,529,252, and U.S. Pat. Nos. 4,816,525 and 4,812,528. In comparison to formulae (1) and (2), this prior art does not disclose the use of complexes containing the phosphine ligands having bulky alkyl substituents employed in the present invention in such hydrogenation processes.

Preparative procedures for the formation of the ruthenium complexes having phosphine ligands containing bulky alkyl substituents used in the present invention are described generally in the literature, for example, by Moers et al, Rec. Trav. Pays Bas, 91 (1972), 591; Johnson et al, J. Chem. Soc. Dalton, (1973), 478; James et al, Adv. in Chem. Ser., 196 (1982), 145; Esteruelas et al, J. Organomet. Chem., 303 (1986), 221; Gill et al, Inorg. Chim. Acta., 32, (1979), 19; and Moers et al, J. Inorg. and Nuc. Chem. Lett., 36, (1974), 2279.

Apart from the simple coordination chemistry, little has been reported of the chemistry of the ruthenium complexes of formulae (1) and (2).

In the present invention, the ruthenium complex of formula (1) or (2) is used to effect selective hydrogenation of carbon-carbon double bonds in copolymers of a conjugated diene and one or more copolymerizable monomers. Such copolymers may be random, alternating or of block structure. Suitable conjugated dienes include $C_4$ to $C_6$ conjugated dienes, such as butadiene, isoprene, dimethylbutaiene and piperylene. Suitable copolymerizable monomers include acrylonitrile and methacrylonitrile, alkenylaromatic hydrocarbons, such as styrene and $\alpha$-methylstryene, and $C_3$ to $C_6$ $\alpha,\beta$-unsaturated mono- or polycarboxylic acids, such as itaconic, fumaric, maleic, acrylic and methacrylic acids.

Preferred copolymers to which the present invention may be applied include butadiene-acrylonitrile copolymer, butadiene-methacrylonitrile copolymer, copolymers of butadiene with acrylonitrile or methacrylonitrile and one or more of the $C_3$ to $C_6$ $\alpha,\beta$-unsaturated carboxylic acids, isoprene-acrylonitrile copolymer, isoprene-methacrylonitrile copolymer, and AB, ABA and ABCBA block copolymers wherein A is butadiene or isoprene, B is styrene or $\alpha$-methylstyrene and C may be a coupling agent residue.

The selective hydrogenation is effected in any convenient manner in a solvent for the copolymer containing the catalyst. The copolymer is dissolved in the solvent and the resulting solution is degassed. The reaction vessel containing the copolymer solution is pressurized with hydrogen gas and the catalyst is added to and dissolved in the solution. Alternatively, the catalyst is added to and dissolved in the copolymer solution and then the reaction vessel may be pressurized with hydrogen. The reaction vessel is rapidly heated to the desired temperature and agitation is initiated. The hydrogenation reaction is allowed to proceed for the desired length of time with the hydrogen pressure preferably held constant. Upon completion of the hydrogenation reaction, the hydrogenated copolymer may be recovered by any convenient method.

The reaction vessel is pressurized with gaseous hydrogen, usually from about 0.5 to about 10 MPa and preferably about 2.5 to about 7.0 MPa. It is preferred to employ pure hydrogen but hydrogen containing small amounts of inert gases, such as nitrogen, also may be used.

The hydrogenation reaction usually is effected at a temperature of about 80° C. to about 200° C., preferably about 110° C. to about 155° C. Under the preferred conditions of temperature and pressure, essentially complete hydrogenation of the carbon-carbon double bonds may be achieved in about 2 to about 9 hours, depending on the catalyst, temperature and pressure used. By using suitable conditions of time and temperature, it is possible to obtain copolymers which are only partially hydrogenated. The degree of hydrogenation may be adjusted to suit the requirements for the product required.

The concentration of ruthenium complex catalyst employed in the hydrogenation process usually ranges from about 0.02 to about 2 wt.% of copolymer. The ruthenium catalyst used herein does not appear to cause the undesirable isomerization of the Δ 4,5-unsaturated nitrile bonds to the stable α,β-unsaturated nitrile moiety which is observed with the previously-described ruthenium complexes, so that higher polymer loadings may be employed. The polymer concentration may range from about 1 to about 30 wt.% of the reaction mixture.

As previously mentioned, the employment of carbonyl ruthenium complexes having phosphine ligands containing bulky alkyl substituents in the present invention inhibits gel formation and hence the addition of gel formation-inhibiting ligand component described in the aforementioned U.S. Pat. Nos. 4,816,525 and 4,812,528, is eliminated or at least minimized.

The solvent used in the process of the present invention may be any organic solvent in which the copolymer and catalyst are soluble and which is not adversely affected by the hydrogenation conditions. Suitable solvents include aryl hydrocarbons and their alkyl and halo derivatives, such as benzene, toluene, xylene, chlorobenzene and dichlorobenzene, or aliphatic ethers, such as tetrahydrofuran and dioxane, or ketones, such as methylethylketone (MEK) and acetone. When employed, MEK is reduced to some extent to 2-butanol under the reaction conditions used but this does not interfere with the desired hydrogena&:ion of the copolymer. Mixed solvents also may be used, in which one component is a low molecular weight ketone and the other is a hydrocarbon solvent, for example, methyl ethyl ketone and chlorobenzene in a volume ratio ranging from about 1:10 to about 10:1.

The hydrogenation products of the process of the invention are vulcanizable elastomers, the vulcanizates of which may be used in applications requiring resistance to oxidizing conditions at elevated temperatures for extended periods of time, for example, the various hoses and seals used in the engine compartment of an automobile.

The hydrogenated copolymers may be vulcanized using conventional peroxide or peroxide/sulfur curing systems. It is preferred to use vulcanizates in which from about 50 to about 99.95 percent, more preferably from about 95 to about 99.95 percent, and most preferably about 99 to about 99.95 percent of the carbon-carbon double bonds in the copolymer have been hydrogenated.

One embodiment of the process of the present invention involves a homogeneous hydrogenation process wherein the hydrogenation is carried out with copolymer and catalyst dissolved in the solvent in a stainless steel autoclave. The copolymer may be dissolved in the organic solvent and the resulting solution purged, degassed and pressured with hydrogen gas. The reaction vessel is heated rapidly to the desired temperature, agitation initiated followed by catalyst addition. Upon completion of the reaction, the hydrogenated copolymer may be recovered by any convenient method well known in the art. For example, the reaction mixture may be mixed with an alcohol or contacted with hot water and/or steam in order to precipitate the copolymer which is then separated, washed if desired, and dried e.g., under vacuum. If desired the catalyst may be recovered by the method described in U.S. Pat. No. 3,545,963.

EXAMPLES

EXAMPLE 1

Samples of $RuHCl(CO)(PCyH_3)_2$ were prepared for testing in hydrogenation reactions by these procedures:

(a) Tricyclohexylphosphine ($PCyH_3$) was reacted with $RuCl_3.nH_2O$ in refluxing methoxyethanol in the presence of $NaBH_4$, in accordance with the procedure of James et al referred to above. Pure product (i.e., $RuHCl(CO)(PCyH_3)_2$) was obtained in good yield in about a 2 hour reaction time. This catalyst Example was used in all the runs reported below, except as indicated.

(b) Tricyclohexylphosphine was reacted with $RuCl_3.nH_2O$ in refluxing methoxyethanol, in accordance with the procedure of Moers et al referred to above. In this case a long reaction time (48 hours) was required. In an attempt to improve on this preparation tricyclohexylphosphine was reacted with $RuCl_3.nH_2O$ and formaldehyde solution in methoxyethanol for about 18 hours and a mixture of $RuHCl(CO)(PCyH_3)$ and $RuHCl(CO)_2(PCyH_3)_2$ was obtained. This mixture was used as the catalyst in some of the runs reported below.

(c) Tricyclohexylphosphine, $RuCl_3.nH_2O$ and triethylamine were heated under reflux in methoxyethanol for 2 to 8 hours. Only about 3 mole equivalents of $PCyH_3$ with respect to ruthenium were required when utilizing this procedure and the desired product was produced in good yield (75 to 85%).

EXAMPLE 2

Studies of hydrogenation were carried our using chlorobenzene solutions of an acrylonitrile-butadiene copolymer containing 62 percent butadiene and sold under the trademark Krynac 38.50 rubber by NOVA Petrochemicals Inc., unless otherwise noted below. All reactions were carried out in a stainless steel autoclave fitted with a glass liner.

The reaction conditions employed, quantities of reactants employed and the results obtained are set forth in the following Table I:

TABLE I

| | Hydrogenation of NBR rubbers using $RuHCl(CO)(PCyH_3)_2$ as Catalyst | | | | | |
|---|---|---|---|---|---|---|
| Run No. | Reaction Temp. °C. | Polymer Conc.$^a$ | Catalyst Conc.$^b$ | Total Pressure/psi | Reaction Time/hrs | Percentage Hydrogenation |
| 1 | 140 | 1.5 | 1.2$^c$ | 600 | 0.5 | 99+ |
| 2 | 140 | 1.5 | 0.6$^c$ | 600 | 1 | 99+ |
| 3 | 140 | 5.0 | 0.6$^c$ | 600 | 1.5 | 99+ |
| 4 | 140 | 5.0 | 0.2$^c$ | 800 | 2 | 99+ |
| 5 | 140 | 5.0 | 0.1$^c$ | 800 | 2 | 99+ |
| 6 | 140 | 5.0 | 0.1 | 800 | 2 | 99+ |
| 7 | 140 | 5.0 | 0.1 | 600 | 3 | 99+ |
| 8 | 140 | 5.0 | 0.05$^c$ | 800 | 4 | 99+ |
| 9 | 140 | 5.0 | 0.05 | 800 | 4 | 99+ |
| 10 | 140 | 7.5 | 0.1 | 800 | 2.5 | 99+ |

TABLE I-continued

Hydrogenation of NBR rubbers using RuHCl(CO)(PCyH$_3$)$_2$ as Catalyst

| Run No. | Reaction Temp. °C. | Polymer Conc.[a] | Catalyst Conc.[b] | Total Pressure/psi | Reaction Time/hrs | Percentage Hydrogenation |
|---|---|---|---|---|---|---|
| 11 | 140 | 7.5 | 0.1 | 600 | 3.5 | 99+ |
| 12 | 140 | 7.5 | 0.05 | 800 | 4.5 | 99+ |
| 13 | 140 | 7.5 | 0.03 | 800 | 10 | 99+ |
| 14 | 140 | 1.5[d] | 0.5 | 600 | 2 | 99+ |
| 15 | 140 | 1.5[e] | 0.5 | 600 | 1 | 99+ |
| 16 | 140 | 1.5[f] | 0.5 | 600 | 3 | 99+ |
| 17 | 150 | 5.0 | 0.1 | 800 | 1.8 | 99+ |
| 18 | 155 | 8.6 | 0.04 | 600 | 6 | 99+ |
| 19 | 155 | 8.6 | 0.06 | 600 | 5 | 99+ |
| 20 | 155 | 8.6 | 0.08 | 600 | 2 | 99+ |
| 21 | 155 | 6.4 | 0.04 | 600 | 5 | 99+ |
| 22 | 155 | 6.4 | 0.04 | 900 | 3.5 | 99+ |
| 23 | 155 | 6.4 | 0.04 | 1200 | 3 | 99+ |
| 24 | 155 | 8.8 | 0.08 | 625 | 2.5 | 99+ |
| 25 | 155 | 12.0 | 0.06 | 625 | 5 | 99+ |
| 26 | 155 | 12.0 | 0.04 | 625 | 4.5 | 99+ |
| 27 | 155 | 12.0 | 0.02 | 625 | 7 | 99+ |
| 28 | 135 | 4.3 | 0.08 | 600 | 3 | 99+ |
| 29 | 145 | 4.3 | 0.08 | 600 | 3 | 99+ |
| 30 | 155 | 4.3 | 0.08 | 600 | 3 | 99+ |
| 31 | 155 | 8.6 | 0.06 | 600 | 5 | 99+ |
| 32 | 165 | 8.6 | 0.06 | 600 | 4 | 99+ |
| 33 | 155 | 10.0[g] | 0.09 | 1000 | 4 | 99+ |
| 34 | 145 | 13.9[g] | 0.05 | 800 | 6 | 99+ |
| 35 | 150 | 20.0[g] | 0.05 | 1000 | 3.5 | 99+ |
| 36 | 160 | 33.0[g] | 0.05 | 1200 | 6 | 99+ |
| 37 | 150 | 30.0[h] | 0.05 | 1000 | 10 | 99+ |
| 38 | 140 | 5.0[i] | 0.1 | 800 | 24 | 0[i] |
| 39 | 140 | 5.0[i] | 0.1 | 800 | 3 | 99+[j] |
| 40 | 140 | 5.0[k] | 0.1 | 800 | 4 | 97.5 |
| 41 | 140 | 5.0[k] | 0.1 | 800 | 6 | 99+ |
| 42 | 140 | 5.0[l] | 0.1 | 800 | 24 | 99+ |
| 43 | 140 | 5.0[l] | 0.1 | 800 | 6 | 99+ |
| 44 | 140 | 5.0[l] | 0.1 | 800 | 6 | 99+ |

Notes
[a] Weight percent w.r.t. to total weight of solution in chlorobenzene
[b] Weight percent w.r.t. weight of copolymer.
[c] Catalyst used was mixture of RuHCl(CO)(PCyH$_3$)$_2$ and RuHCl(CO)$_2$(PCyH$_3$)$_2$.
[d] Krynac 38.50 rubber was dissolved in toluene.
[e] Copolymer was a carboxylated acrylonitrile-butadiene copolymer containing 66 percent butadiene and sold under the trademark Krynac 110c rubber by Polysar Ltd.
[f] Copolymer used was a carboxylated acrylonitrile-butadiene copolymer containing 67.5 percent butadiene and sold under the trademark Krynac 221 rubber by NOVA Petrochemicals Inc.
[g] Krynac 38.50 rubber was dissolved in 2 butanone.
[h] Krynac 38.25 rubber was dissolved in 2-butanone.
[i] Copolymer was impure.
[j] Copolymer was purified prior to hydrogenation.
[k] Copolymer used was a carboxylated acrylonitrile-butadiene copolymer containing 67.5 percent butadiene and sold under the trademark Krynac K231 by NOVA Petrochemicals Inc.
[l] Copolymer used was a carboxylated acrylonitrile-butadiene copolymer containing 68.5 percent butadiene are sold under the trademark XC976 by NOVA Petrochemicals Inc.

As may be seen from the results presented in Table I, greater than 99% hydrogenation of the copolymer was achieved under widely varying reaction conditions of polymer and catalyst concentrations. The rates of reaction observed are much greater than observed for other ruthenium complexes as described in the aforementioned U.S. Pat. Nos. 4,816,525 and 4,812,528.

No compounds besides the copolymer, catalyst and chlorobenzene or alternate solvent were included in the reaction mixture and no gel formation or any carbon-carbon double bond isomerization was observed in any of the runs.

Both standard NBR polymer and carboxylated ones are rapidly hydrogenated in the presence of the catalyst, although the rates are slower in the latter case, with quantitative hydrogenation being achieved, except for runs 38 and 40. It is thought that an impurity in the rubber killed the catalyst in run 38. The problem was cured by initially purifying the rubber, as seen in run 39.

Run 40 was terminated at 4 hours since the I.R. spectrum of the sample indicated 99% hydrogenation. However, an $^1$H NMR spectrum of isolated polymer showed only 97.5% hydrogenation. Increasing the reaction time, as in run 41, enabled quantitative hydrogenation to be achieved.

EXAMPLE 3

Additional complexes of formula 1 were prepared, as follows:

(a) RuHCl(CO)(PCyH$_3$)$_2$ prepared as described in Example 1(a) was reacted with various sodium carboxylate salts to yield RuH(RCO$_2$)(CO)(PCyH$_3$)$_2$ where R=CH$_3$, CH$_2$Cl or Ph.

(b) The complex RuCl$_2$(CO)(PCyH$_3$)$_2$ was isolated free from RuHCl(CO)(PCyH$_3$)$_2$ by reacting RuCl$_3$·nH$_2$O and PCyH$_3$ in refluxing methanol for about 5 hours.

(c) RuHCl(CO)$_2$(PCyH$_3$)$_2$ was prepared by reaction of RuHCl(CO)(PCyH$_3$)$_2$ prepared as described in Example 1(c) with carbon monoxide.

(d) RuCl(CH=CH(Ph))(CO)(PCyH$_3$)$_2$ was prepared by reaction of RuHCl(CO)(PCyH3)$_2$ prepared as described in Example 1(d) with phenylacetylene.

(e) The complex RuHCl(CO)(P$^i$Pr$_3$)$_2$ was prepared using the procedure of Esteruelas et al described above by heating RuCl$_3$.nH$_2$O and P$^i$Pr$_3$ in methanol for 18 hours. The acetate-containing analog of this complex, RuH(CH$_3$CO$_2$)(CO)(P$^i$Pr$_3$)$_2$, was prepared by reacting with sodium acetate.

(f) The complex RuCl(Ph)(CO)(PCyH$_3$)$_2$ was prepared by reaction of RuHCl(CO)(PCyH$_3$)$_2$ with diphenyl mercury in refluxing toluene. This method was originally used by Roper and Wright, J. Organomet. Chem., 142 (1977), Cl to synthesize RuCl(Ph)(CO)(PPh$_3$)$_2$ from RuHCl(CO)(PPh$_3$)$_3$.

(g) The complex RuHCl(CO)(py)(PCyH$_3$)$_2$ was prepared by treating a solution of RuHCl(CO)(PCyH$_3$)$_2$ in toluene with pyridine at room temperature for 24 hours, following the procedure of Moers and Langhout, Rec. Trav. Pays Bas, 91 (1972), 591. The complex was obtained as an off white solid which was quite stable in air and apparently insoluble in solvents, such as toluene and chloroform.

(h) In the procedure (g), P(OMe)$_3$ and PhCN were substituted for pyridine to produce the corresponding trimethlphosphite- and benzonitrile- containing complex.

EXAMPLE 4

The activities of the complexes prepared in Example 3 and others produced by similar procedures, towards hydrogenation of Krynac 38.50 rubber were tested following the procedure of Example 2. The complexes employed, reaction conditions employed, quantities of reactants employed and the results obtained are set forth in the following Table II:

no gel formation or carbon-carbon double bond isomerization was evident. Gel formation occurred with run 64, where a bulky alkyl substituent was not used.

SUMMARY OF DISCLOSURE

In summary of this disclosure, the present invention provides a novel process for effecting hydrogenation of carbon-carbon double bond unsaturation in conjugated diene copolymers using certain ruthenium complexes. Modifications are possible within the scope of this invention.

What we claim is:

1. In a process for the selective hydrogenation of the carbon-carbon double bonds in a copolymer of a conjugated diene with at least one copolymerizable monomer, the improvement which comprises effecting said hydrogenation in the presence of at least one divalent ruthenium catalyst of the general formula:

$$RuXY(CO)ZL_2 \quad (1)$$

or $$RuX(NO)(CO)L_2 \quad (2)$$

wherein X is a halogen atom or a carboxylate group, Y is a halogen atom, a hydrogen atom, a phenyl group, a carboxylate group, or a phenylvinyl group, Z is CO, pyridine, benzonitrile, trimethylphosphite or not ligan, and L is a phosphine ligand having at least one bulky alkyl substituent, wherein the term "bulky alkyl substituents" means substituents which cause the phosphine cone angle to be at least 160°.

TABLE II

Hydrogenation of Krynac 38.50 rubber using Ruthenium Complexes as Catalysts

| Run[a] No. | Formula | Catalyst conc[b] | Polymer conc[c] | Total Press/psi | Reaction Time/hrs | Percentage Hydrogenation |
|---|---|---|---|---|---|---|
| 45 | RuCl$_2$(CO)(PCyH$_3$)$_2$ | 0.5 | 1.5 | 600 | 1.5 | 99+ |
| 46 | RuCl$_2$(CO)(PCyH$_3$)$_2$ | 0.1 | 5 | 800 | 5 | 99+ |
| 47 | RuH(CH$_3$CO$_2$)(CO)(PCyH$_3$)$_2$ | 0.5 | 1.5 | 600 | 1.5 | 99+ |
| 48 | RuH(CH$_3$CO$_2$)(CO)(PCyH$_3$)$_2$ | 0.1 | 5 | 800 | 3 | 99+ |
| 49 | RuH(PhCO$_2$)(CO)(PCyH$_3$)$_2$ | 0.5 | 1.5 | 600 | 2 | 99+ |
| 50 | RuH(PhCO$_2$)(CO)(PCyH$_3$)$_2$ | 0.1 | 5 | 800 | 3.25 | 99+ |
| 51 | RuH(ClCH$_2$CO$_2$)(CO)(PCyH$_3$)$_2$ | 0.1 | 5 | 800 | 4 | 99+ |
| 52 | RuHCl(CO)$_2$(PCyH$_3$)$_2$ | 0.1 | 5 | 800 | 4 | 99+ |
| 53 | RuCl(R[d])(CO)(PCyH$_3$)$_2$ | 0.5 | 1.5 | 600 | 2 | 99+ |
| 54 | RuHCl(CO)(P$^i$Pr$_3$)$_2$ | 0.5 | 1.5 | 600 | 1 | 99+ |
| 55 | RuHCl(CO)(P$^i$Pr$_3$)$_2$ | 0.01 | 1.5 | 600 | 2.5 | 99+ |
| 56 | RuHCl(CO)(P$^i$Pr$_3$)$_2$ | 0.1 | 5 | 800 | 2 | 99+ |
| 57 | RuHCl(CO)(P$^i$Pr$_3$)$_2$ | 0.1 | 7.5 | 800 | 3.2 | 99+ |
| 58 | RuH(CH$_3$CO$_2$)(CO)(P$^i$Pr$_3$)$_2$ | 0.5 | 1.5 | 600 | 1.4 | 99+ |
| 59 | RuH(CH$_3$CO$_2$)(CO)(P$^i$Pr$_3$)$_2$ | 0.1 | 5 | 800 | 2.5 | 99+ |
| 60 | RuCl(CO)(PhCO$_2$)(PCyH$_3$)$_2$ | 0.5 | 1.5 | 600 | 2 | 99+ |
| 61 | RuCl(CO)(PhCO$_2$)(PCyH$_3$)$_2$ | 0.1 | 5 | 800 | 5 | 99+ |
| 62 | Ru(Ph)Cl(CO)(PCyH$_3$)$_2$ | 0.5 | 1.5 | 600 | 1.3 | 99+ |
| 63 | Ru(Ph)Cl(CO)(PCyH$_3$)$_2$ | 0.1 | 5 | 800 | 2 | 99+ |
| 64 | Ru(Ph)Cl(CO)(PPh$_3$)$_2$ | 0.5 | 1.5 | 600 | 0.5 | 60[e] |
| 65 | RuCl(NO)(CO)(PCyH$_3$)$_2$ | 0.5 | 1.5 | 600 | 8 | 99+ |
| 66 | RuCl(NO)(CO)(PCyH$_3$)$_2$ | 0.1 | 5 | 800 | 7 | 99+ |
| 67 | RuHCl(CO)(py)(PCyH$_3$)$_2$ | 0.1 | 5 | 800 | 2 | 99+ |
| 68[f] | RuHCl(CO)(py)(PCyH$_3$)$_2$ | 0.05 | 10 | 800 | 4 | 99+ |
| 69 | RuHCl(CO)(P(OMe)$_3$)(PCyH$_3$)$_2$ | 0.5 | 1.5 | 600 | 3 | 99+ |
| 70[f] | RuHCl(CO)(P(OMe)$_3$)(PCyH$_3$)$_2$ | 0.05 | 10 | 800 | 6 | 99+ |
| 71 | RuHCl(CO)(PhCN)(PCyH$_3$)$_2$ | 0.1 | 5 | 800 | 2 | 99+ |
| 72[f] | RuHCl(CO)(PhCN)(PCyH$_3$)$_2$ | 0.05 | 10 | 800 | 4 | 99+ |

Notes
[a]Reaction temperatures were 140° C., unless noted.
[b]Weight percent w.r.t. weight of polymer.
[c]Weight percent w.r.t. total weight of solution.
[d]R is CH=CH(Ph).
[e]Gel formed.
[f]Reaction temperature was 145° C.

As may be seen from Table II, as in the case of Example 2, enhanced hydrogenation activity was observed as compared to other known ruthenium complexes, greater than 99% conversion was achieved and again 2. The process of claim 1 wherein X is a chlorine or a bromine atom or a carboxylate group of the formula $R_4COO-$ in which $R_4$ is selected from alkyl and aryl groups.

3. The process of claim 2 wherein X is a chlorine atom or a carboxylate group which is an unsubstituted acetate, mono, di- and tri-halo unsubstituted acetate, unsubstituted benzoate, alkyl-substituted benzoate or halo-substituted benzoate.

4. The process of claim 3 wherein the carboxylate groups are $ClCH_2COO-$, $Cl_2CCHCOO-$, $F_3CCOO-$, $CH_3COO-$, $C_6H_5COO-$, p-$CH_3C_6H_4COO-$ or p-$ClC_6H_4COO-$.

5. The process of claim 3 wherein Y is a chlorine atom, a hydrogen atom, a phenyl group or an $R_4COO-$ group in which $R_4$ is selected from alkyl and aryl groups.

6. The process of claim 5 wherein Z is CO.

7. The process of claim 5 where Z is no ligand.

8. The process of claim 5 wherein Z is pyridine.

9. The process of claim 5 wherein Z is benzonitrile.

10. The process of claim 5 wherein Z is trimethylphosphite.

11. The process of claim 1 wherein L is a phosphine ligand of the formula $-PR_1R_2R_3$ in which at least one of $R_1$, $R_2$ and $R_3$ is a bulky alkyl group.

12. The process of claim 11 wherein each of $R_1$, $R_2$ and $R_3$ is a bulky alkyl group.

13. The process of claim 11 wherein said bulky alkyl group is selected from cyclohexyl, isopropyl, tert-butyl, sec-butyl and benzyl.

14. The process of claim 12 wherein said bulky alkyl group is selected from cyclohexyl, isopropyl, tert-butyl, sec-butyl and benzyl.

15. The process of claim 1 wherein said ruthenium catalyst is selected from carbonylchlorohydrido bis(tricyclohexylphosphine) ruthenium (II), carbonylchlorohydridopyridyl bis(tricyclohexylphosphine) ruthenium (II), carbonylchlorohydridobenzonitrile bis(tricyclohexylphosphine) ruthenium (II), carbonylchlorohydridotrimethylphosphite bis (tricyclohexylphosphine) ruthen ium (II), carbonylacetatohydrido bis(tricyclohexylphosphine) ruthenium (II), carbonylchloroacetatohydrido bis(tricyclohexylphosphine) ruthenium (II), carbonylbenzoatohydrido bis(tricyclohexylphosphine) ruthenium (II), carbonylchloroacetatohydrido (tricyclohexylphosphine) ruthenium (II), carbonylchloro(phenylvinyl) bis(tricyclohexylphosphine) ruthenium (II), biscarbonylchlorohydrido bis(tricyclohexylphosphine) ruthenium (II), carbonylchlorohydrido bis(tri-isopropylphosphine) ruthenium (II), carbonylacetatohydrido bis(tri-isopropylphosphine) ruthenium (II), carbonylchlorobenzoato bis(tricyclohexylphosphine) ruthenium (II), carbonylchlorophenyl bis(tricyclohexylphosphine) ruthenium (II) and carbonylchloronitrosyl bis(tricyclohexylphosphine) ruthenium (II).

16. The process of claim 1 wherein said hydrogenation is effected at an applied hydrogen pressure of about 0.5 to about 10 MPa at a temperature of about 80 to about 200° C.

17. The process of claim 16 wherein said pressure is about 2.5 to about 7.0 MPa and said temperature is about 110° to about 160° C.

18. The process of claim 17 carried out in solvent which is chlorobenzene, o-dichlorobenzene, benzene, toluene, 2-butanone or acetone.

19. The process of claim 17 carried out in a solvent comprising a mixture of a low molecular weight ketone and a hydrocarbon solvent.

20. The process of claim 19 wherein said solvent mixture comprises a mixture of methyl ethyl ketone and chlorobenzene in a volume ratio of about 1:10 to about 10:1.

21. The process of claim 16 carried out in a solvent at a catalyst concentration of about 0.02 to about 2 wt.% of copolymer and at a copolymer concentration of about 1 to about 30 wt.%.

22. The process of claim 1 wherein said copolymer is selected from the group consisting of butadiene-(meth)acrylonitrile copolymers, isoprene-(meth)acrylonitrile copolymers, copolymers of butadiene with (meth)acrylonitrile and at least one monomer selected from itaconic acid, fumaric acid, (meth)acrylic acid and maleic acid, and AB, ABA and ABCBA block copolymers wherein A is butadiene or isoprene, B is styrene or $\alpha$-methylstyrene and C is a coupling agent residue.

23. The process of claim 1 wherein from about 30 to about 99.95 percent of said carbon-carbon double bonds are hydrogenated.

24. The process of claim 1 wherein from about 95 to about 99.95 percent of said carbon-carbon double bonds are hydrogenated.

* * * * *